Oct. 28, 1941.  J. J. HARRIS  2,260,316
RETRACTABLE AIRPLANE WING
Filed Oct. 5, 1939  2 Sheets-Sheet 2
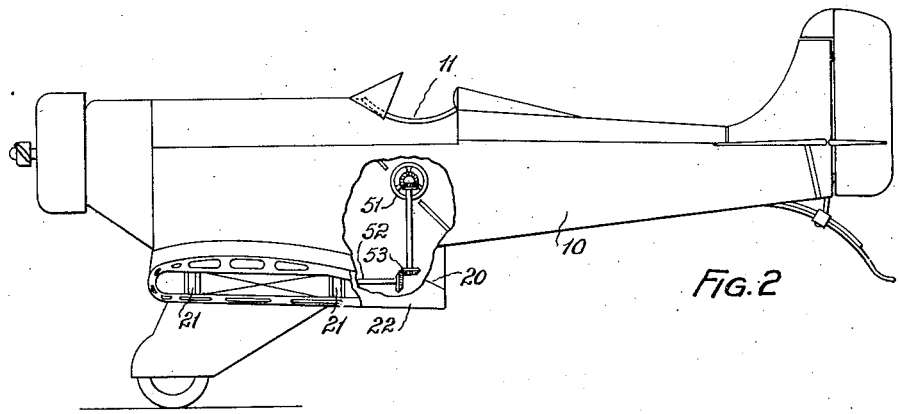
FIG. 2
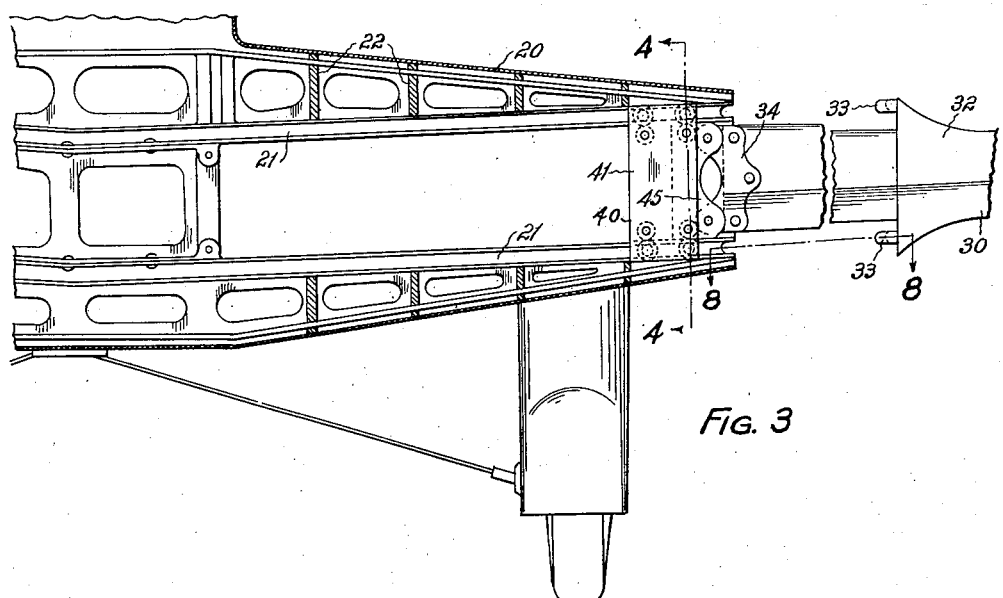
FIG. 3
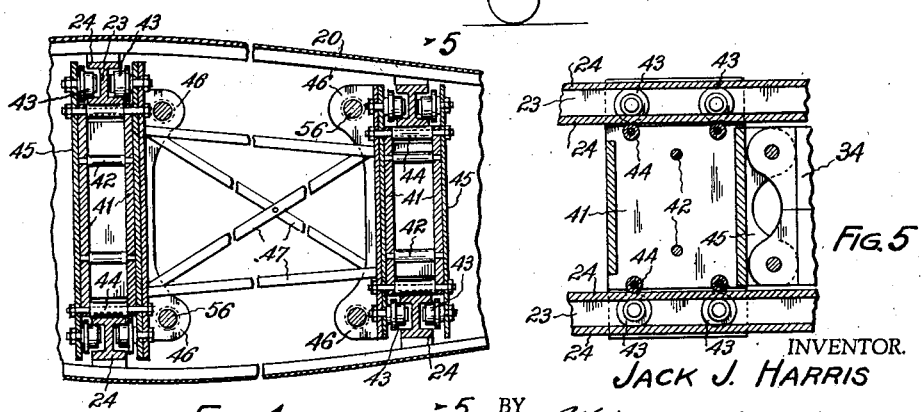
FIG. 4
FIG. 5
INVENTOR.
JACK J. HARRIS
BY Morton S. Brockman
ATTORNEY.

Patented Oct. 28, 1941

2,260,316

UNITED STATES PATENT OFFICE 2,260,316

RETRACTABLE AIRPLANE WING

Jack J. Harris, Cleveland, Ohio, assignor of one-half to Louis Kinczell, Cleveland, Ohio Application October 5, 1939, Serial No. 298,089

5 Claims. (Cl. 244—43)

This invention relates to aircrafts and particularly to airplanes having means for varying the effective span of their wing members.

As conducive to a better understanding of this invention, it may be well to point out that an airplane requires less wing lifting surface when cruising high in the air than it does when landing or taking-off. A large wing surface increases the stability of the craft and therefore facilitates maneuverability and enhances the safety of the machine. A relatively smaller wing surface decreases the air resistance during flight, permits faster travel and gives the plane a proportionately larger cruising range with the same power output.

It is therefore desirable to have a plane which embodies the advantages of a large wing span when landing or taking-off and of a small wing span when cruising. Many attempts have been made in the past to equip airplanes with telescopic or retractable wing tips which may be readily extended for landing or rising and which may be just as easily drawn in or contracted during flight when a sufficient height and speed is obtained.

Of the many retractable wings known to the art, none have been found to be practical enough for adaptation on large ships such as heavy transports or bombers. The main reason for this being in the structural weaknesses that existed at the junctures of the main wing or body and the secondary or extendable wing. In those cases attempts were made to overcome the weaknesses by strengthening the materials with braces but the additional braces and structure were so complex or heavy that no real advantages were gained by the use of the retractable wing.

The primary object of this invention is to provide a retractable airplane wing which is rigid, sturdy and yet light in weight.

Another object is to provide a device of the type mentioned with a carriage mounting for the secondary wing which will operate smoothly and uniformly on guide tracks in the main wing.

A further object is to provide a means which would engage or lock the main wing and the secondary wing together when retracted so as to form a substantially rigid structure without having abrupt ends, irregular surfaces or protrusions which would interfere with the normal air stream encountered at high speeds.

These and other objects as well as a fuller understanding of the invention may be had by referring to the following description and claims together with the accompanying drawings in which like parts are designated by like reference characters, and in which:

Figure 2 is a side view of the same plane with parts broken away to show construction and assembly;

Figure 3 is an enlarged view taken along the lines 3—3 of the Figure 1 showing assembly of the primary and secondary wing members;

Figure 4 is a cross-sectional view of the carriage portion of the wing assembly taken along the lines 4—4 of the Figure 3;

Figure 5 is a view of the carriage member taken along the lines 5—5 of the Figure 4;

Figure 6 is a cross-sectional view of the retracting mechanism taken along the lines 6—6 of the Figure 1;

Figure 7 is a sectional view taken along the lines 7—7 of the Figure 1;

Figure 8 is a view taken along the lines 8—8 of the Figures 3 and 9; and

Figure 9 is a view taken along the lines 9—9 of the Figure 8.

Figure 1:
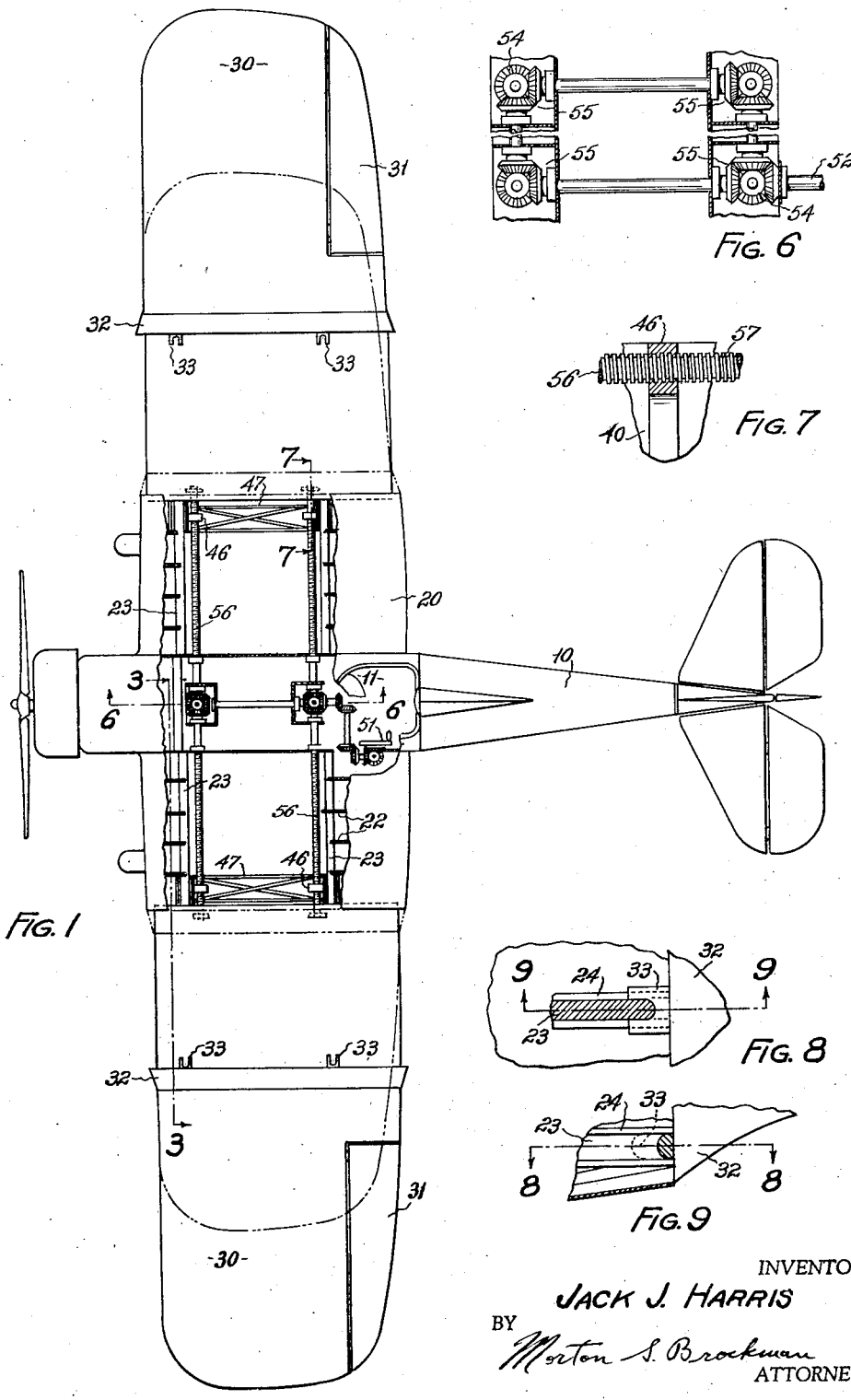
Figure 1 is a top view of a plane embodying the invention with parts of the fuselage broken away to show construction and assembly.

This invention consists broadly of hollow primary side wing members 20, retractable secondary wing members 30 and the carriage 40 on which the secondary wing member is mounted and which rides in the hollow portion of the said primary wing member. The primary wing 20 is mounted or is made integral with the fuselage 10 in a conventional manner. The device also embodies a screw mechanism for extending or retracting the secondary wing member 30 and also a streamlined abutment 32 which in addition to firmly locking the two wing members together acts as a trim or finish member for the truncated end of the primary wing 20 where it meets the smooth surface of the secondary wing 30. Each of the foregoing elements, members or mechanisms will be described hereinafter separately and in detail.

The Figures 1 and 2 show a plane embodying this invention. In these figures certain parts are cut away to show the wing framework and the interior of the cock-pit 11. The Figure 1 shows in full line the relative position of the two wing members expanded and also shows in broken lines the positions of the secondary wing 30 when fully retracted. This view particularly illustrates how the effective wing surface of the plane is increased approximately thirty per cent.

The primary wing member 20 consists of four laterally extending I-beams or rails 21 around which there is a hollow framework of conventional girders and web-members 22. The extreme outer ends of the rails 21 are trimmed or cut so that their vertical portions 23 are overlapped by the two horizontal or seriph-like portions 24 by about six inches.

The rails 21 are rigidly attached to the framework and are evenly spaced so as to form top and bottom and fore and aft parallel tracks on which the carriage may ride.

The retractable secondary wing member 30 fits snugly into the hollow member of the primary wing member 20. It is, however, longer than the hollow chamber and extends outwardly, even when fully retracted, about one-half of its length. The retractable wing members 30 are provided with movable ailerons 31 which may be controlled by conventional means well known to the art.

About half way between the two ends of the secondary wing 30 and extending circumferentially around it, is an abutment member 32. The abutment member 32 is made integral with the wing member, tapers or slopes toward the outer ends and has a flat or perpendicular inner side which fits against the abrupt or truncated edge of the primary wing 20. Extending inward and in line with the rails 21 are four pairs of fingers 33 which fit between horizontal portions 24 and on both sides of the vertical portions 23 of the rails 21. The construction is such, that when the abutment 32 contacts the end of the wing member 20, the two wing members 20 and 30 are fully streamlined and rigidly locked together. When the airfoil is expanded, the abutment 32 does, in a limited degree, resist the free movement of air past the airfoil, but inasmuch as the secondary wing member 30 is extended only at low speeds and for slowing down the plane, this added resistance is a help rather than a hindrance in the handling of the plane. The inner end of the secondary wing 30 is provided with four tabs 34 aligned both vertically and horizontally that have suitable holes therein for connection with the link members 45 hereinafter described.

The carriage member 40 consists of fore and aft vertical trucks each of which is provided with rollers that engage the vertically aligned rails 21. Two trucks are rigidly joined together by the cross braces 47 to form carriage members. Each of the trucks consists of two spaced plates 41 and 41a, one on each side of the vertically aligned rails 21. Spacers 42, a trifle longer than the width of the rails 21 join the plates 41 and 41a together. Between the plates 41 and 41a near each of their four corners are affixed four sets of rollers, each set of rollers consisting of two short rollers 43 and a long roller 44. The two short rollers 43 ride on the inside surfaces of the horizontal portions of the rail 21 and on both sides of the vertical portions 23. The long roller rides on the bottom surface of the portion 24 of the top rail 21 and on the upper facing surface of the bottom rail 21. There are altogether sixteen short rollers and eight long rollers on each of the two carriage members and there is one carriage member on each side of the plane. The rear plate 41a of the fore truck and the front plate 41 of the aft truck are provided with four internally threaded lugs 46. These lugs 46 are mounted close to the rollers 43 and 44 and are about midway between the inner and outer sets of rollers.

In order to firmly attach the secondary wing 30 to the carriage member 40, the forward plate 41 of the fore truck and the rear plate 41a of the aft truck are each provided with additional plates herein referred to as link members 45. These link members 45 have suitable holes therein for rigid engagement with the tabs 34.

The secondary wing member 30 is retracted or extended by means of the control handle 51 in the cock-pit 11 and which is in a position easy to reach by the operator. The handle 51 is connected to a series of shafts and beveled gears located in the side wall and floor of the fuselage and imparts the desired rotating motion to the shaft 52. The shaft 52 has on its end a beveled gear 53 which engages the beveled gear 54 in the lower rear of four similar gear boxes or transmission units 55. The four transmission units 55 are located in the exact center of the fuselage and in line with the wing members 20 and 30. Extending laterally from the transmission units 55 are four control rods 56. The control rods 56 have on their inside ends beveled gears and are so arranged that they may be rotated by the operation of the handle 51. Each of the control rods 56 has screw threads 57 thereon which engage the internally threaded lugs 46 which are mounted on the carriage member 40. The control rods 56 are also provided with simple stops at both their inner and outer ends which restrict or limit the range of movement of the secondary wing member 30. The stops, however, are not illustrated in the drawings as their construction may be readily visualized by those familiar with the art.

It will be noted that the instant invention is a distinct advantage over the similar devices of the prior art because of; first, its rigid and sturdy assembly at the carriage portion, the breadth of the truck members and the large number of rollers thereon insure a rigid construction. Secondly, the four control rods in each wing placed near the rollers, insure a smooth and easy operation without any bending or jamming which might interfere with proper flight of the machine.

It will now be clear that there is provided by this invention a retractable airplane wing which accomplishes the objects of the invention. While the invention has been described in a specific form and while certain broad general terms have been used, it is to be understood that the embodiment of the invention as described is suggestive only and is not to be considered in a limiting sense. It is to be further understood that as there may be other forms or adaptations of the invention, those modifications are also considered to be within the broad scope of the invention as no limitations upon it are intended other than those imposed thereon by the scope of the appended claims.

I claim:

1. In an airplane, a retractable airfoil, comprising in combination, a primary wing, a plurality of tracks extending laterally through the said primary wing, a secondary wing telescopically connected to the primary wing and having a mounting means engaging the said tracks, a streamlining abutment mounted on the said secondary wing, and a locking means on the said abutment engageable with the said tracks.

2. In an airplane, a retractable airfoil, comprising in combination, a hollow primary wing having a truncated end, a plurality of tracks mounted laterally on the primary wing and terminating at the truncated end, a secondary wing telescopically extendable from the truncated end of the said primary wing, a carriage member connected to the secondary wing and movable on the said tracks, a streamlining abutment mounted on the said secondary wing, a locking means attached to the said abutment engageable with the said tracks at the truncated end of the primary wing, and a screw mechanism mounted in the primary wing in a manner whereby the said secondary wing may be contracted, the said locking means be made to engage the said tracks and the said abutment be made to close the truncated end of the primary wing.

3. In an airfoil of the type having a stationary primary wing element, a retractable secondary wing element, laterally extending guide rails and a retraction mechanism; a truck member for connecting the said wings, comprising in combination, spaced parallel plate members, rollers mounted on said plate members movable on the said guide rails, link members mounted on the plate members and attached to the secondary wing element, and a means mounted on the plate members and engageable with the said retraction mechanism.

4. In an airfoil of the type having a stationary primary wing element, a retractable secondary wing element, laterally extending guide rails and a retraction mechanism; a truck member for connecting the said wings, comprising in combination, spaced inner and outer plate members, horizontal and vertical rollers mounted between the plate members and movable on the said guide rails, a link member mounted on the outer plate member attached to the secondary wing element, and lugs attached to the inner plate member and engageable with the retraction mechanism.

5. In an airfoil of the type having a stationary primary wing element including spaced top and bottom and fore and aft laterally extending I-beam rail members and having a retractable secondary wing element, a combined secondary wing carriage and retraction mechanism, comprising, spaced fore and aft truck members engageable with the top and bottom rail members of the primary wing element, each of the said truck members having spaced rollers thereon engageable with horizontal portions of each I-beam rail member and on each side of the vertical portions thereof, connecting brace members rigidly joining the spaced truck members together forming a substantially rectangular carrying device movable between the said top and bottom and fore and aft rail members, link members mounted on the said truck members having means for rigidly connecting the said secondary wing element thereto, a plurality of jack screws extending laterally and adjacent to the said top and bottom rail members and engageable with contiguous truck members, and a transmission means in the airfoil simultaneously rotating the said jack screws in a manner whereby the said carrying device is caused to move on the said rail members retracting or extending the attached secondary wing element.

JACK J. HARRIS.